(12) United States Patent
Au et al.

(10) Patent No.: US 7,272,315 B1
(45) Date of Patent: Sep. 18, 2007

(54) TECHNIQUE FOR TRANSFERRING INFORMATION IN A PASSIVE OPTICAL NETWORK

(75) Inventors: How Kee Au, Ottawa (CA); Randy Kuang, Kanata (CA); Guo Qiang Wang, Kanata (CA)

(73) Assignee: Nortel Networks Limited, Quebec (CA)

( * ) Notice: Subject to any disclaimer, the term of this patent is extended or adjusted under 35 U.S.C. 154(b) by 1122 days.

(21) Appl. No.: 10/364,401

(22) Filed: Feb. 12, 2003

(51) Int. Cl.
*H04B 10/20* (2006.01)
*H04J 14/00* (2006.01)
(52) U.S. Cl. .......................................... 398/63; 398/67
(58) Field of Classification Search ................. 398/58, 398/60, 63, 66
See application file for complete search history.

(56) References Cited

U.S. PATENT DOCUMENTS 5,926,476 A * 7/1999 Ghaibeh ................ 370/395.65
6,504,853 B1 * 1/2003 Lindgren et al. ........... 370/468
2002/0126688 A1 * 9/2002 Lindgren et al. ........... 370/442

* cited by examiner

*Primary Examiner*—Shi K. Li
(74) *Attorney, Agent, or Firm*—Hunton & Williams LLP

(57) ABSTRACT

A technique for transferring information in a passive optical network is disclosed. The technique may be realized as a method for transferring information in a passive optical network having a plurality of network nodes. The method comprises transmitting a downstream signal during a control/management time slot of a periodic frame having N control/management time slots and M data time slots, wherein the downstream signal includes an identifier of a service node in the network, wherein each of the N control/management time slots corresponds to a respective one of N possible service nodes in the network. The method also comprises responding to the downstream signal with an upstream signal during the control/management time slot of the periodic frame. The method further comprises allocating at least one of the M data time slots of the periodic frame to the service node based at least in part upon the upstream signal.

22 Claims, 4 Drawing Sheets

Time t1 - bw allocation

Time t2 - ONU C drops off

Time t3 - OLT adjusts time slots

TECHNIQUE FOR TRANSFERRING INFORMATION IN A PASSIVE OPTICAL NETWORK

FIELD OF THE INVENTION

The present invention relates generally to passive optical networks and, more particularly, to a technique for transferring information in a passive optical network.

BACKGROUND OF THE INVENTION

Over the last few decades, telecommunications carriers have been considering an inexpensive means of using optical fibers to support access to telecommunications services over a last mile of connection between residential and business customers and a central office of a telecommunications service provider. The greatest bandwidth requirement for telecommunications services for these customers is typically not greater than a couple of hundreds of megabits per second (Mbps). To support this bandwidth requirement, studies have shown that passive optical networks (PON) are the access technology that has attracted the most interest and shown the greatest commercial potential.

Referring to FIG. 1, there is shown an embodiment of a traditional passive optical network (PON) 100 for providing access to telecommunications services over a last mile of connection between customers and a service provider. That is, the traditional PON 100 comprises a telecommunications network 102 comprising an optical line terminal (OLT) 104 (e.g., a central office of a telecommunications service provider) connected to a passive optical splitter/combiner 106 via a pair of optical fibers 110 (i.e., an upstream optical fiber and a downstream optical fiber). The passive optical splitter/combiner 106 is connected to a plurality of optical network units (ONU) 108 via a plurality of pairs of optical fibers 112 (i.e., each pair having an upstream optical fiber and a downstream optical fiber). Each of the plurality of ONUs 108 maintains a connection with one or more customers (not shown) for facilitating telecommunications services between these customers and the telecommunications service provider.

The traditional PON 100 operates such that downstream information from the OLT 104 is broadcast to all of the ONUs 108 through the downstream optical fibers 110 and 112. Each of the ONUs 108 only processes downstream information having an address of the specific ONU 108. Also, in the upstream direction, each of the ONUs 108 is allocated a time slot within which the specific ONU 108 sends information, thereby insuring that the specific ONU 108 has sole access to the upstream optical fiber 110 during its time slot and conflicts with other ONUs 108 are avoided.

A number of technologies have been considered by standards bodies as a transport mechanism for transferring information in the upstream and downstream directions in the traditional PON 100. To date, most of these technologies have been asynchronous in nature, such as, for example, Asynchronous Transfer Mode (ATM) and Ethernet.

In a traditional ATM-based PON (A-PON), information to be transferred is packaged into ATM cells for transmission between the OLT 104 and the ONUs 108. Specifically, the International Telecommunication Union (ITU) has specified the downstream bit rate to be 622.08 Mbps and the upstream bit rate to be 155.52 Mbps. The ITU has also specified that the downstream direction shall support 4×56 ATM cells every frame, and that control and management information shall be sent in an ATM cell at a specific time within the frame. The ITU has further specified that the upstream direction shall support 53 cells, each of 56 bytes, per frame, such that the standardized structure of an ATM cell is modified to carry control and management information.

In a traditional Ethernet-based PON (E-PON), information is transferred in Ethernet packets, whereby each ONU 108 negotiates interface parameters (e.g., bit rate) with the OLT 104, and each ONU 108 is subsequently allowed to transmit information at its line rate when permission is given by the OLT 104.

In traditional A-PON and E-PON networks, the transmission of synchronous data (e.g., voice signals) may produce a jitter problem unless circuit emulation functions are employed in the ONUs 108 to retain the synchronous nature of synchronous data signals as they traverse between nodes in the network 102. Also, in traditional A-PON and E-PON networks, an ONU 108 is only allowed to transmit data when permitted to do so by the OLT 104. Further, in traditional A-PON and E-PON networks, complex algorithms are required for allocating upstream time slots for the ONUs 108.

It should be noted that a synchronous technology has also been considered as a transport mechanism for information transfer in the upstream and downstream directions in the traditional PON 100. That is, the Synchronous Optical Network (SONET) is a synchronous transmission system wherein data is transferred based on a 125 microsecond (μsec) frame. However, transferring data from the plurality of ONUs 108 to the single OLT 104 in the traditional PON 100 based upon the 125 μsec SONET frame is a problem because the traditional PON 100 needs 125 μsec to transmit each frame of data. Thus, the traditional PON 100 must wait 125 μsec from the transmission of a current frame to the transmission of a subsequent frame, which is unacceptable.

In view of the foregoing, it would be desirable to provide a technique for transferring information in a passive optical network which overcomes the above-described inadequacies and shortcomings in an efficient and cost effective manner.

SUMMARY OF THE INVENTION

According to the present invention, a technique for transferring information in a passive optical network is provided. In one particular exemplary embodiment, the technique may be realized as a method for transferring information in a passive optical network having a plurality of network nodes. The method comprises transmitting a downstream signal during a control/management time slot of a periodic frame having N control/management time slots and M data time slots, wherein the downstream signal includes an identifier of a service node in the network, wherein each of the N control/management time slots corresponds to a respective one of N possible service nodes in the network. The method also comprises responding to the downstream signal with an upstream signal during the control/management time slot of the periodic frame. The method further comprises allocating at least one of the M data time slots of the periodic frame to the service node based at least in part upon the upstream signal.

In accordance with other aspects of this particular exemplary embodiment of the present invention, the at least one of the M data time slots may also be allocated to the service node based upon a predetermined allocation of the M data time slots. If such is the case, the at least one of the M data time slots may also be allocated to the service node based upon the number of N possible service nodes in the network.

In accordance with further aspects of this particular exemplary embodiment of the present invention, the upstream signal may beneficially include a request for a specified number of the M data time slots. Alternatively, the upstream signal may beneficially include a request for a required number of the M data time slots to satisfy a service.

In accordance with additional aspects of this particular exemplary embodiment of the present invention, the method may further beneficially comprise transmitting a second downstream signal during the control/management time slot of the periodic frame, and then responding to the second downstream signal with a second upstream signal during the control/management time slot of the periodic frame, wherein the second upstream signal includes a request for a specified number of the M data time slots. If such is the case, the at least one of the M data time slots may also be allocated to the service node based upon the request for the specified number of the M data time slots. Alternatively, the method may further beneficially comprise transmitting a second downstream signal during the control/management time slot of the periodic frame, and then responding to the second downstream signal with a second upstream signal during the control/management time slot of the periodic frame, wherein the second upstream signal includes a request for a required number of the M data time slots to satisfy a service. If such is the case, the at least one of the M data time slots may also be allocated to the service node based upon the request for the required number of the M data time slots to satisfy a service.

In accordance with still other aspects of this particular exemplary embodiment of the present invention, the method may further beneficially comprise transmitting a second downstream signal during the control/management time slot of the periodic frame, and then responding to the second downstream signal with a second upstream signal during the control/management time slot of the periodic frame, wherein the second upstream signal includes a request for none of the M data time slots.

In accordance with still further aspects of this particular exemplary embodiment of the present invention, each of the N control/management time slots and each of the M data time slots may beneficially be 1 microsecond in duration, and wherein N+M=125 such that the periodic frame is 125 microseconds in duration.

In another particular exemplary embodiment, the technique may be realized as a system for transferring information in a passive optical network having a plurality of network nodes. The system comprises an optical line node for transmitting a downstream signal during a control/management time slot of a periodic frame having N control/management time slots and M data time slots, and for allocating at least one of the M data time slots of the periodic frame to a service based at least in part upon an upstream signal. The system also comprises an optical service node for supporting the service, and for responding to the downstream signal with the upstream signal during the control/management time slot of the periodic frame, wherein the downstream signal includes an identifier of the optical service node in the network, and wherein each of the N control/management time slots corresponds to a respective one of N possible optical service nodes in the network. The system may further comprise additional features similar to those recited above with respect to the above-described method.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

Figure 2:
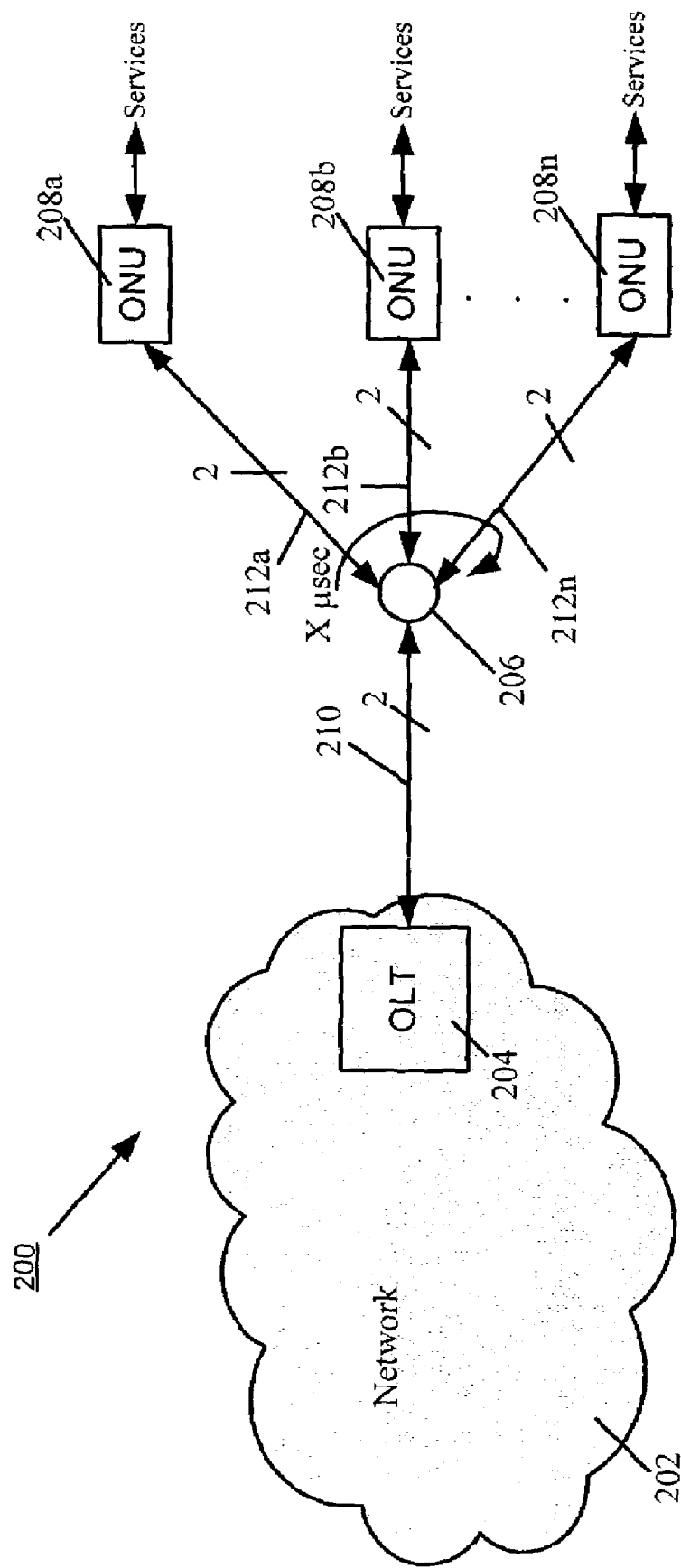
FIG. 2 shows an embodiment of a cyclic passive optical network (CPON) for providing access to telecommunications services in accordance with the present invention.

Referring to FIG. 2, there is shown an embodiment of a cyclic passive optical network (CPON) 200 for providing access to telecommunications services over a last mile of connection between customers and a service provider in accordance with the present invention. That is, the CPON 200 comprises a telecommunications network 202 comprising an optical line terminal (OLT) 204 (e.g., a central office of a telecommunications service provider) connected to a passive optical splitter/combiner 206 via a pair of optical fibers 210 (i.e., an upstream optical fiber and a downstream optical fiber). The passive optical splitter/combiner 206 is connected to a plurality of optical network units (ONU) 208 via a plurality of pairs of optical fibers 212 (i.e., each pair having an upstream optical fiber and a downstream optical fiber). Each of the plurality of ONUs 208 maintains a connection with one or more customers (not shown) for facilitating telecommunications services between these customers and the telecommunications service provider.

Figure 1:
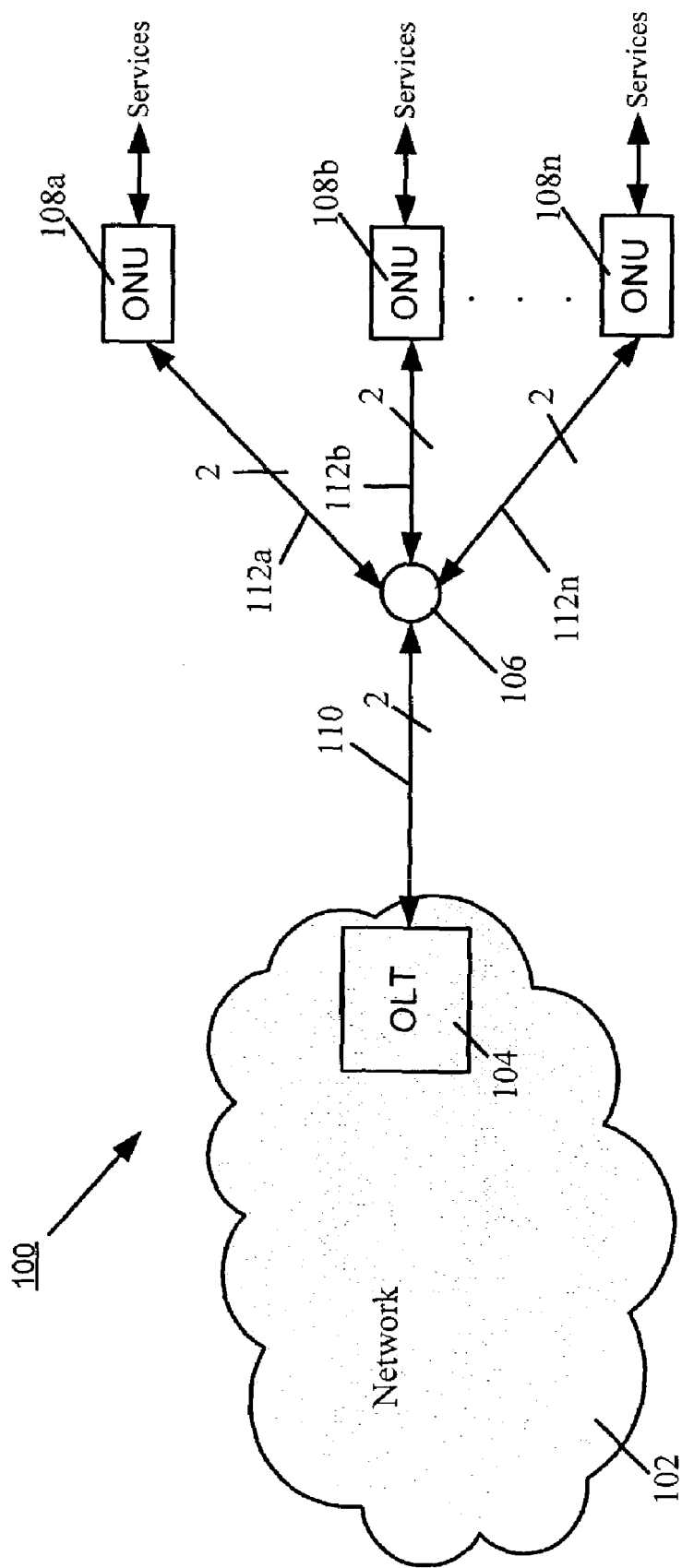
FIG. 1 shows an embodiment of a traditional passive optical network (PON) for providing access to telecommunications services.

Similar to the traditional PON 100 of FIG. 1, the CPON 200 of FIG. 2 operates such that downstream information from the OLT 204 is broadcast to all of the ONUs 208 through the downstream optical fibers 210 and 212. However, in the CPON 200 of FIG. 2, each of the ONUs 208 processes downstream information, which may or may not include an address of the specific ONU 208. For example, one or more of the ONUs 208 may know when to expect downstream information from the OLT 204. Alternatively, one or more of the ONUs 208 may only process downstream information having an address of the specific ONU 208. In the upstream direction, each of the ONUs 208 is allocated a time slot within which the specific ONU 208 sends information, thereby insuring that the specific ONU 208 has sole access to the upstream optical fiber 210 during its time slot and conflicts with other ONUs 208 are avoided.

The type and method of allocating time slots also differs greatly between the traditional PON 100 of FIG. 1 and the CPON 200 of FIG. 2. Also, the rate at which information is transferred differs greatly between the traditional PON 100 of FIG. 1 and the CPON 200 of FIG. 2. That is, in the CPON 200 of FIG. 2, a periodic frame of X μsec having a plurality of control/management time slots and a plurality of data time slots is utilized to allow each of the ONUs 208 to communicate control/management and data information to the OLT 204. The signal transmission rate in both the upstream and downstream optical fibers 210 and 212 is much higher (e.g., at least 10 times or more higher) than the rate of service supported by the ONUs 208.

Figure 3:
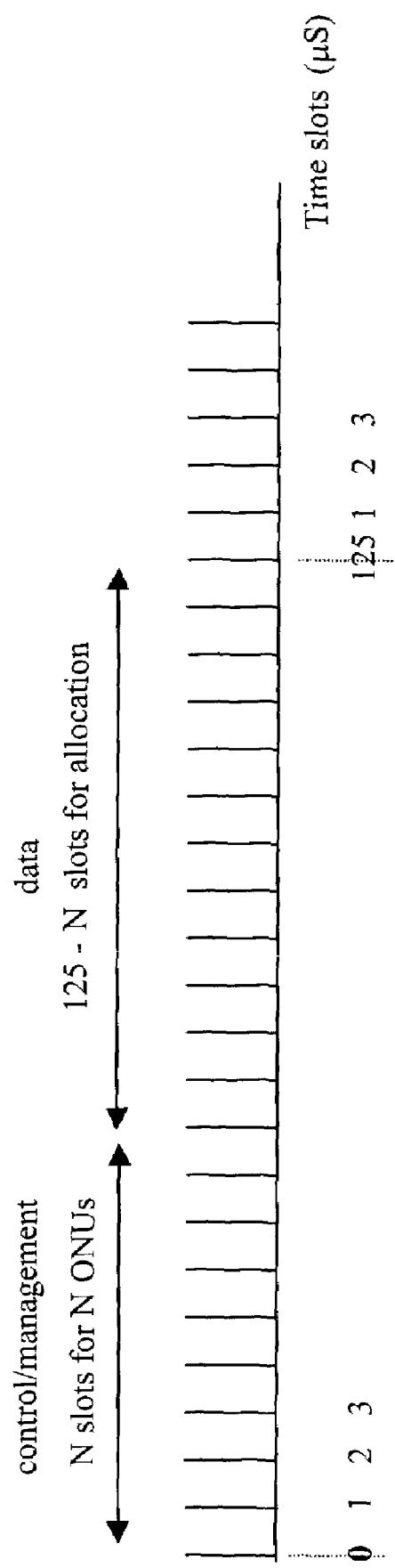
FIG. 3 shows a periodic frame having a plurality of control/management time slots and a plurality of data time slots for use in the cyclic passive optical network (CPON) of FIG. 2 in accordance with the present invention.

For example, referring to FIG. 3, the periodic frame may be 125 μsec in duration, and each of the plurality of control/management time slots and each of the plurality of data time slots may be 1 μsec in duration, thereby allowing for a total of 125 time slots. Of course, the present invention is not limited in this regard. For example, the control/management time slots and the data time slots may be greater than or less than 1 μsec in duration, and the periodic frame may be greater than or less than 125 μsec in duration.

However, assuming, for purposes of illustration, that each of the plurality of control/management time slots and each of the plurality of data time slots is 1 μsec in duration and the periodic frame is 125 μsec in duration, thereby allowing for a total of 125 time slots, the plurality of data time slots may be allocated to ONUs 208 based upon the amount of bandwidth that may be required by the ONUs 208 to support associated services. For example, control/management and data information may be transferred from the ONUs 208 to the OLT 204 during each of the plurality of control/management time slots and each of the plurality of data time slots, respectively, at a rate of at least 1 gigabit per second (Gbps) using presently available transport technologies. A 1 Gbps transport rate for a duration of 1 μsec every 125 μsec would provide a bandwidth of 8 Mbps for each time slot. Thus, since the greatest bandwidth requirement for telecommunications services is typically not greater than a couple of hundreds of Mbps, one or more data time slots may be allocated to each ONU 208 to support an associated service such as, for example, Ethernet, ATM, SONET, and others.

The exact method of allocating data time slots to each ONU 208 is controlled by the OLT 204. The OLT 204 controls the allocation of data time slots by communicating with each ONU 208 during a respective control/management time slot. That is, each of the plurality of control/management time slots corresponds to a respective one of the plurality of ONUs 208 in the network 200. This one-to-one correspondence between control/management time slots and ONUs 208 is assigned and maintained by the OLT 204. Also, each of the plurality of ONUs 208 maintains an address in the network 200, and this address is provided to the OLT 204 upon initialization of the network 200 or when the ONU 208 is added to the network 200. Thus, the OLT 204 typically initiates communication with each ONU 208 by transmitting a downstream signal to the ONU 208 possibly using the address of the ONU 208 during the assigned control/management time slot of the ONU 208.

The ONU 208 responds to the downstream signal sent by the OLT 204 by sending an upstream signal back to the OLT 204 during the assigned control/management time slot of the ONU 208. This upstream signal may be sent during the same frame that the downstream signal is sent, or a later frame. Upon receipt of this upstream signal, depending upon the configuration of the network 200, the OLT 204 may immediately allocate one or more data time slots to the ONU 208 or the wait for a separate specific request for one or more data time slots from the ONU 208. In any event, the upstream signal provides a basis for the OLT 204 that the ONU 208 may require one or more data time slots.

At this point it should be noted that both the downstream signal and the upstream signal may include control and management information. In addition to data time slot allocation information, this control and management information may include other information such as, for example, peer auto discovery information, timing synchronization information, loop-back testing information, exchange service parameters, on-demand-bandwidth management information, and fault detection information.

The configuration of the network 200 may be such that, upon receipt of the upstream signal, the OLT 204 may allocate one or more data time slots to the ONU 208 based upon a predetermined allocation of one or more data time slots. The configuration of the network 200 may also be such that, upon receipt of the upstream signal, the OLT 204 may allocate one or more data time slots to the ONU 208 based upon the total number, or possible total number, of ONUs 208 in the network 200. The configuration of the network 200 may further be such that the upstream signal itself includes a request for a specified number of data time slots, and the OLT 204 may then allocate this specified number of data time slots to the ONU 208 based upon this request. The configuration of the network 200 may still further be such that the upstream signal itself includes a request for a required number of data time slots to satisfy a service, and the OLT 204 may then allocate this required number of data time slots to the ONU 208 based upon this request.

As mentioned above, the network 200 may be configured to have the OLT 204 wait for a separate specific request from the ONU 208 for one or more data time slots. The separate specific request may be in the form of another upstream signal that includes a request for a specified number of data time slots, and the OLT 204 may then allocate this specified number of data time slots to the ONU 208 based upon this request. Alternatively, the separate specific request may be in the form of another upstream signal that includes a request for a required number of data time slots to satisfy a service, and the OLT 204 may then allocate this required number of data time slots to the ONU 208 based upon this request.

In an alternative embodiment, the separate specific request may come after the OLT 204 transmits another downstream signal to the ONU 208 possibly using the address of the ONU 208 during the assigned control/management time slot of the ONU 208. The ONU 208 may then respond to this second downstream signal by sending another upstream signal back to the OLT 204 during the assigned control/management time slot of the ONU 208. This upstream signal may include a request for a specified number of data time slots, and the OLT 204 may then allocate this specified number of data time slots to the ONU 208 based upon this request. Alternatively, the ONU 208 may respond to this second downstream signal by sending another upstream signal back to the OLT 204 during the assigned control/management time slot of the ONU 208. This upstream signal may include a request for a required number of data time slots to satisfy a service, and the OLT 204 may then allocate this required number of data time slots to the ONU 208 based upon this request.

Of course, in all of the above cases, the OLT 204 may deny any request for data time slots for any number of reasons. For example, if a bandwidth is allocated to one service (e.g., an Internet Protocol (IP) service), and a user is fraudulently attempting to increase the bit rate, the network 200 will not permit such an increase to occur as each time slot only allows a specific bit rate subscribed. This is a means of providing quality of service (QoS) control. In the same manner, the downstream bandwidth may be allocated in the exact mirror image of the upstream bandwidth allocation. Indeed, this may be a method of indirectly introducing a security management system in the downstream and upstream propagation directions.

Figure 4A:
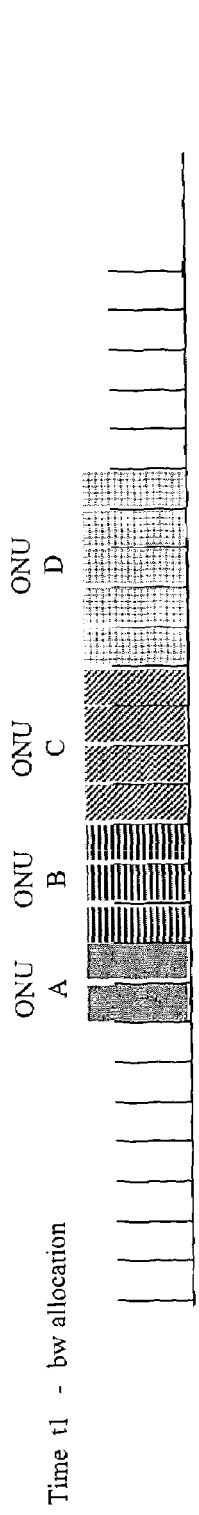
FIGS. 4A-4C show how time slots may be dynamically adjusted in the cyclic passive optical network (CPON) of FIG. 2 in accordance with the present invention.
Figure 4B:
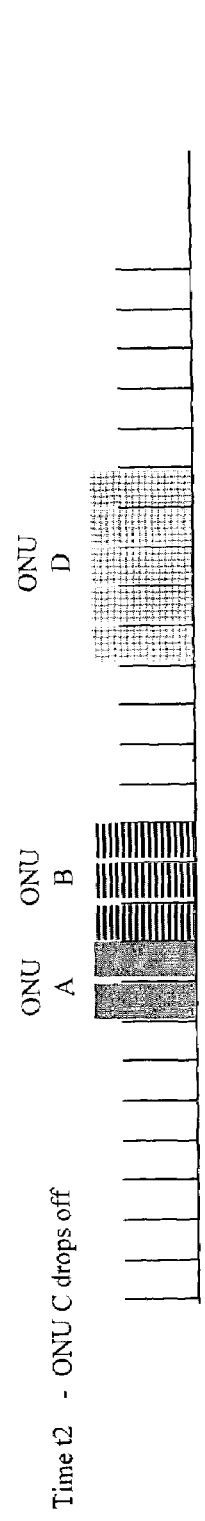
Figure 4C:
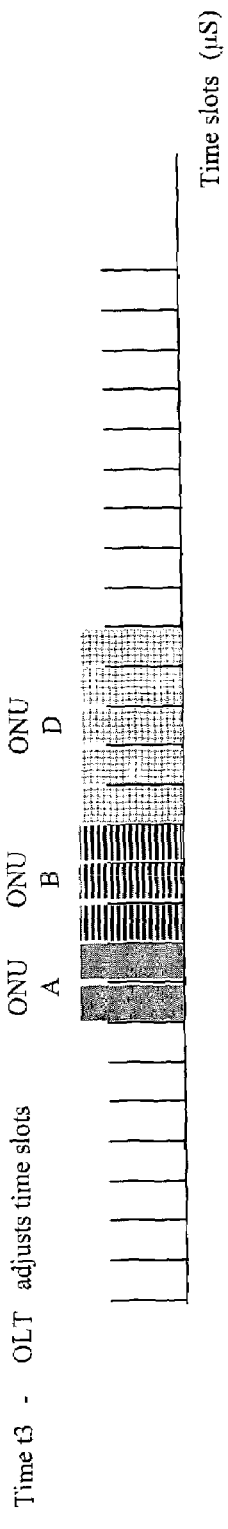

The network 200 may also accommodate dynamic adjustment of time slots. For example, referring to FIGS. 4A-4C, at time t1, four ONUs 208 (i.e., ONU A, ONU B, ONU C, and ONU D) are utilizing different numbers of data time slots to transfer different amounts of data to the OLT 204. At time t2, one ONU 208 (i.e., ONU C) no longer requires data time slots to transfer data to the OLT 204. At time t3, the OLT 204 reallocates the data time slots of one ONU 208 (i.e., ONU D) so that all of the data time slots being utilized are contiguous.

It can easily be visualized that each of the data time slots can be allocated upon demand. Indeed, multiple contiguous time slots can be allocated on demand. For example, assuming the 125 μsec frame duration, the 1 μsec time slot duration, and the 1 Gbps data transport rate set forth above with respect to FIG. 3, to transport a SONET OC3 frame, which represents a bit rate of 155 Mbps, an ONU 208 may request 20 contiguous data time slots, representing 160 Mbps of bandwidth, to process each 125 μsec SONET frame of data.

At this point, it is illustrative to consider a practical example. That is, assuming the 125 μsec frame duration, the 1 μsec time slot duration, and the 1 Gbps data transport rate set forth above with respect to FIG. 3, also assume that an ONU 208 supports a service which requires the processing of a DS1 time division multiplexed (TDM) signal which has a bit rate of 1.544 Mbps per second. In each TDM frame, there are 193 data bits arriving at a service port of the ONU 208 once every 125 μsec. If the ONU 208 only supports Ethernet internet protocol (IP) services, these 193 data bits will be transported as a payload in an IP packet. The IP packet has an overhead of about 200 bits, so an equivalent DS1 IP packet is about 400 bits. This IP packet is sent to the OLT 204 in less than 500 nanoseconds at 1 Gbps rate discussed above. Thus, a single 1 μsec data time slot is sufficient to accommodate the DS1 rate TDM signal. In the next 125 μsec, the ONU 208 has ample time to process the next frame of DS1 data. The IP packet that is sent to the OLT 204 every 125 μsec is stored at the OLT 204 and may be synchronously forwarded by the OLT 204 once every 125 μsec to any synchronous network to which it is connected. Thus, the CPON 200 facilitates an IP node to transport TDM signals in IP packets without circuit emulation. In addition, the TDM signals will not experience any signal jitter while they are being transported throughout the CPON 200. It should be noted that this is an illustration in principle. That is, it should be noted that an Ethernet packet must have a payload of at least 46 bytes. This 46 byte payload can easily transport the 193 data bits.

In summary, the operation of the network 200 is based on the following fundamental principles. A periodic frame having a plurality of control/management time slots and a plurality of data time slots is the basis of operation. Each ONU 208 is assigned a control/management time slot for communicating with the OLT 204. Each ONU 208 may be allocated one or more data time slots during every periodic frame, thereby allowing each ONU 208 to meet its service bandwidth requirements. The transmission of data from each ONU 208 to the OLT 204 is at a bit rate that is far greater than that of the bit rate of the service at each ONU 208. This insures that synchronous service data can be processed at each ONU 208 without any disruptive contention problems, and without any circuit emulation functions which are required in A-PON and E-PON networks. Since the network 200 can support synchronous service data, other service data (i.e., asynchronous service data) can also be accommodated.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for transferring information in a passive optical network having a plurality of network nodes, the method comprising:

transmitting a downstream signal during a control/management time slot of a periodic frame having control/management time slots and data time slots, wherein the downstream signal includes an identifier of a service node in the network, wherein each of the control/management time slots corresponds to a respective service node in the network;

responding to the downstream signal with an upstream signal during the control/management time slot of the periodic frame; and allocating at least one of the data time slots of the periodic frame to the service node based at least in part upon the upstream signal.

2. The method as defined in claim 1, wherein the at least one of the data time slots are also allocated to the service node based upon a predetermined allocation of the data time slots.

3. The method as defined in claim 2, wherein the at least one of the data time slots are also allocated to the service node based upon the number of service nodes in the network.

4. The method as defined in claim 1, wherein the upstream signal includes a request for a specified number of the data time slots.

5. The method as defined in claim 1, wherein the upstream signal includes a request for a required number of the data time slots to satisfy a service.

6. The method as defined in claim 1, wherein the downstream signal is a first downstream signal and the upstream signal is a first upstream signal, further comprising:

transmitting a second downstream signal during the control/management time slot of the periodic frame; and responding to the second downstream signal with a second upstream signal during the control/management time slot of the periodic frame, wherein the second upstream signal includes a request for a specified number of the data time slots.

7. The method as defined in claim 6, wherein the at least one of the data time slots are also allocated to the service node based upon the request for the specified number of the data time slots.

8. The method as defined in claim 1, wherein the downstream signal is a first downstream signal and the upstream signal is a first upstream signal, further comprising:
 transmitting a second downstream signal during the control/management time slot of the periodic frame; and
 responding to the second downstream signal with a second upstream signal during the control/management time slot of the periodic frame, wherein the second upstream signal includes a request for a required number of the data time slots to satisfy a service.

9. The method as defined in claim 8, wherein the at least one of the data time slots are also allocated to the service node based upon the request for the required number of the data time slots to satisfy a service.

10. The method as defined in claim 1, wherein the downstream signal is a first downstream signal and the upstream signal is a first upstream signal, further comprising:
 transmitting a second downstream signal during the control/management time slot of the periodic frame; and
 responding to the second downstream signal with a second upstream signal during the control/management time slot of the periodic frame, wherein the second upstream signal includes a request for none of the data time slots.

11. The method as defined in claim 1, wherein there are N control/management time slots and M data time slots, wherein each of the N control/management time slots and each of the M data time slots is 1 microsecond in duration, and wherein N+M=125 such that the periodic frame is 125 microseconds in duration.

12. A system for transferring information in a passive optical network having a plurality of network nodes, the system comprising:
 an optical line node for transmitting a downstream signal during a control/management time slot of a periodic frame having control/management time slots and data time slots, and for allocating at least one of the data time slots of the periodic frame to a service based at least in part upon an upstream signal; and
 an optical service node for supporting the service, and for responding to the downstream signal with the upstream signal during the control/management time slot of the periodic frame;
 wherein the downstream signal includes an identifier of the optical service node in the network, and wherein each of the control/management time slots corresponds to a respective optical service node in the network.

13. The system as defined in claim 12, wherein the at least one of the data time slots are also allocated to the service based upon a predetermined allocation of the data time slots.

14. The system as defined in claim 13, wherein the at least one of the data time slots are also allocated to the service based upon the number of optical service nodes in the network.

15. The system as defined in claim 12, wherein the upstream signal includes a request for a specified number of the data time slots.

16. The system as defined in claim 12, wherein the upstream signal includes a request for a required number of the data time slots to satisfy the service.

17. The system as defined in claim 12, wherein the downstream signal is a first downstream signal and the upstream signal is a first upstream signal, wherein:
 the optical line node also transmits a second downstream signal during the control/management time slot of the periodic frame; and
 the optical service node also responds to the second downstream signal with a second upstream signal during the control/management time slot of the periodic frame, wherein the second upstream signal includes a request for a specified number of the data time slots.

18. The system as defined in claim 17, wherein the at least one of the data time slots are also allocated to the service based upon the request for the specified number of the data time slots.

19. The system as defined in claim 12, wherein the downstream signal is a first downstream signal and the upstream signal is a first upstream signal, wherein:
 the optical line node also transmits a second downstream signal during the control/management time slot of the periodic frame; and
 the optical service node also responds to the second downstream signal with a second upstream signal during the control/management time slot of the periodic frame, wherein the second upstream signal includes a request for a required number of the data time slots to satisfy the service.

20. The system as defined in claim 19, wherein the at least one of the data time slots are also allocated to the service node based upon the request for the required number of the data time slots to satisfy the service.

21. The system as defined in claim 12, wherein the downstream signal is a first downstream signal and the upstream signal is a first upstream signal, wherein:
 the optical line node also transmits a second downstream signal during the control/management time slot of the periodic frame; and
 the optical service node also responds to the second downstream signal with a second upstream signal during the control/management time slot of the periodic frame, wherein the second upstream signal includes a request for none of the data time slots.

22. The system as defined in claim 12, wherein there are N control/management time slots and M data time slots, wherein each of the N control/management time slots and each of the M data time slots is 1 microsecond in duration, and wherein N+M=125 such that the periodic frame is 125 microseconds in duration.

* * * * *